June 5, 1951  A. L. CATFORD  2,555,784
INTERRELATED PROPELLER AND ENGINE CONTROL
Filed Sept. 11, 1946  6 Sheets-Sheet 1

Inventor
A. L. Catford
By
Emery, Holcombe & Blair
Attorneys

June 5, 1951 A. L. CATFORD 2,555,784
INTERRELATED PROPELLER AND ENGINE CONTROL
Filed Sept. 11, 1946 6 Sheets-Sheet 4

Inventor
Adrian L. Catford
By
Emery, Holcombe & Blair
Attorney

June 5, 1951  A. L. CATFORD  2,555,784
INTERRELATED PROPELLER AND ENGINE CONTROL
Filed Sept. 11, 1946   6 Sheets-Sheet 6

Inventor
Adrian L. Catford
By
Emery, Holcombe & Blair
Attorney

Patented June 5, 1951

2,555,784

UNITED STATES PATENT OFFICE 2,555,784

INTERRELATED PROPELLER AND ENGINE CONTROL

Adrian Leslie Catford, Hampton, England, assignor to D. Napier & Son Limited, London, England, a company of Great Britain Application September 11, 1946, Serial No. 696,101
In Great Britain September 17, 1945

2 Claims. (Cl. 170—135.74)

This invention relates to apparatus for the control of internal combustion engines for the propulsion of aircraft and is designed for use with apparatus for the control of datum boost and ignition, and also with a variable pitch air screw or propeller and automatic gear change for the supercharger. With these features the present invention constitutes a complete system of automatic engine control.

According to this invention the improved apparatus comprises in combination a differential gear, a connection between one main wheel of this gear and the engine throttles, a servomotor, conveniently referred to as a primary servomotor, by which the other and opposite main wheel of the differential gear can be rotated, a second and subsidiary servomotor controlled by an operating lever and by which a cage carrying the pinions of the differential gear can be rotated about the gear axis, a valve controlling the flow of pressure liquid to the primary servomotor, a capsule subject on the one hand to boost pressure and on the other hand to the opposite action of a separate spring this capsule being operative to set the valve controlling the primary servomotor, a camshaft rotatable by the subsidiary servomotor when this motor rotates the cage of the differential gear, a datum boost cam on this camshaft which acting through a lever can vary the force exerted by the said spring on the capsule and thus affect the setting of the valve of the primary servomotor, and a second cam on this shaft which is operative on the airscrew governor and the ignition control. The valve of the primary servomotor is a piston valve which is conveniently constructed and arranged so that it floats between two diaphragms which serve as oil seals the valve being balanced on the one hand by the tendency to move it in one direction due to the boost pressure on the capsule together with a spring acting on one end of the valve, and on the other hand by that spring which, as mentioned, acts on the capsule in opposition to the boost pressure.

The accompanying drawings illustrate how the invention may be carried out in practice. In these drawings, Figure 1 is a diagrammatic representation of the apparatus.

Figure 1:
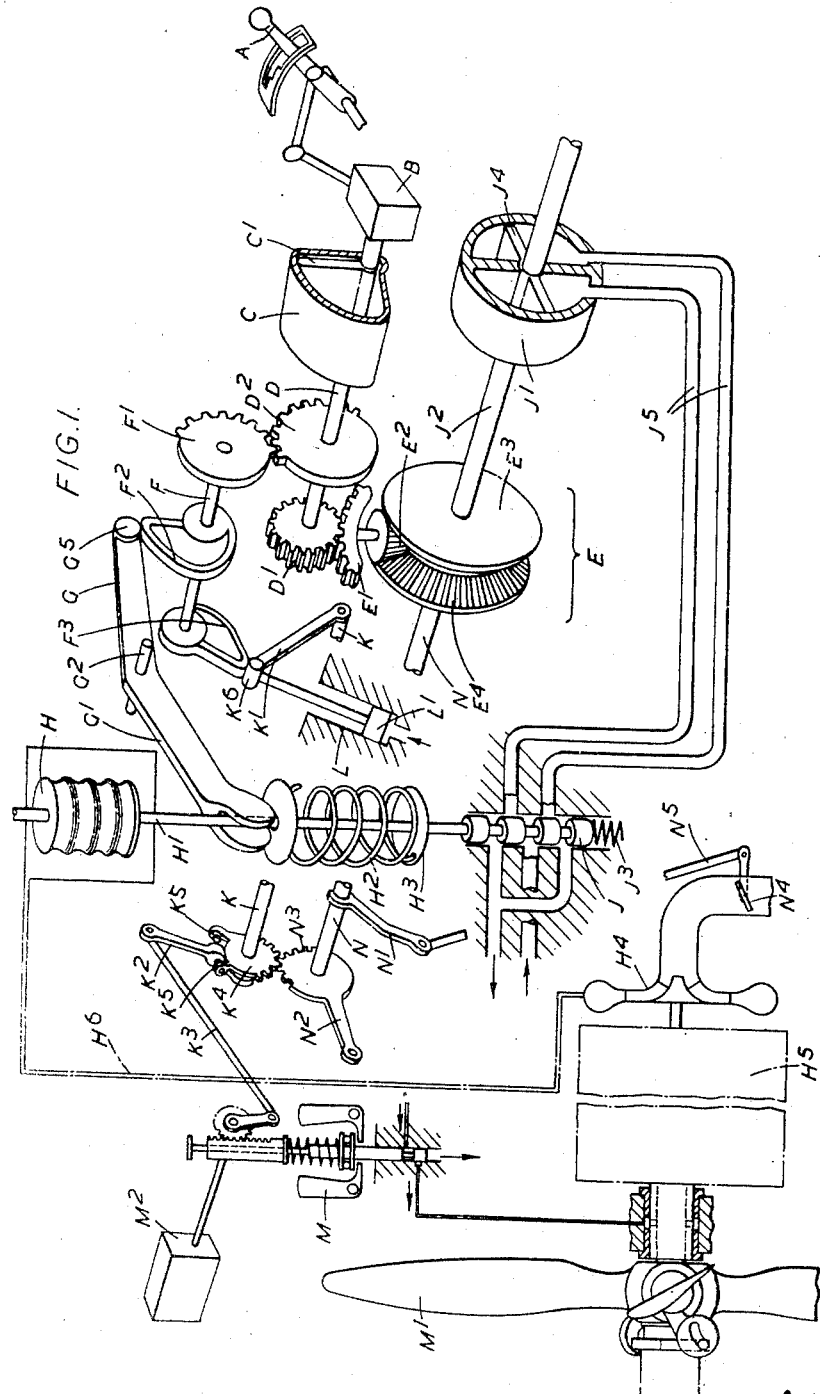

In the first place the whole apparatus may conveniently be described in general terms with reference to the diagrammatic view in Figure 1, and subsequently the parts will be described more in detail and with reference to the other illustrations in which the parts are shown as they may be made in practice.

The operating lever A, through mechanism indicated at B, controls the subsidiary servomotor C which imparts rotation to the shaft D. The mechanism B by which the servomotor is controlled is preferably constructed and operative as otherwise known. The differential gear E which is used is preferably of the bevel wheel and bevel pinion type and the cage with the pinions E2 which carries a toothed rack E1 is rotated about the axis of the gear by a pinion D1 meshing with the rack E1 and mounted on the shaft D of the servomotor C. This motor also transmits rotation to a cam shaft F through a gear wheel D2 on the shaft D which meshes with a wheel F1 on the shaft F. On the shaft F is a datum boost cam F2 and a second cam F3 the function of which will be described hereunder. A two armed lever G, G1 pivoted at G2 has at the end of the arm G a roller G5 which bears on the cam F2.

A capsule H, subject to boost pressure from the outlet of the supercharger H4 of the engine H5 through a pipe H6, bears at its upper end against an adjustable abutment and at its other end is connected to one end of a rod H1 whose other end can act on and move a piston valve J which controls a servomotor J1 which rotates a shaft J2 which carries one of the bevel wheels E3 of the differential gear E. A coiled spring H2 abuts at one end on a disc or the like H3 fixed on the capsule rod H1 while on the other end of this spring bears the end of the arm G1 of the lever whose other arm G is acted on by the datum boost cam F2. The spring H3 acts in opposition to the action of the capsule on the valve J of the primary servomotor J1, the force exerted by the spring being varied through the cam F2 and the lever G, G1. Means to be described hereunder are conveniently provided for effecting adjustments in the lever G, G1 so as to vary the action of the cam F2 and determine the setting of the valve J.

The second cam F3 on the shaft F is operative on the airscrew governor M and ignition control mechanism M2. A shaft K carries a lever K1 the end of which bears on the surface of the cam F3 with which it is maintained in contact by pressure liquid acting in a cylinder L on a piston L1 which is connected to the lever K1, or by a spring. On the shaft K is a second lever K2 from which extends a connection K3 to the governor M which determines the setting of the blades of the airscrew M1 in a known manner, the governor being thus adjusted through the action of the cam F3. The connection K3 also actuates the ignition control mechanism M2. A shaft N coaxial with the shaft J2 of the servomotor J1 carries the second bevel wheel E4 of the differential gear E and also a lever N1 connected to the throttle N4 through a link N5, and movable on it is a manually operable lever N2. This lever N2 functions as an override lever in that it carries a toothed sector N3 which meshes with teeth on a member K4 rotatable on the shaft K and provided with stops K5 which lie on each side of the lever K2. Thus by movement of the override lever N2 and through the stops K5 the lever K2 can be moved and thereby, and through the governor, the blades of the airscrew can be adjusted to fully fine pitch. These stops K5 as actuated by the override lever can also be used to produce other effects independently of the position of the operating lever A.

This apparatus may be designated as a servomotor actuated boost control operating through a differential gear. The capsule H which is totally evacuated tries to collapse towards its fixed abutment under the influence of the boost pressure and this movement is aided by a small spring J3 acting on the remote end of the piston valve J of the servomotor J1. On the other hand the datum boost spring H2 tries to draw out the capsule in opposition to its tendency to move under the influence of the boost pressure. By mounting the capsule in this way it is caused to be very sensitive to changes of boost pressure since all friction is substantially eliminated between the piston valve J and the capsule owing to the transmission of movement from one to the other being by way of surfaces which are maintained in contact and not through parts pivotally connected.

The apparatus will now be described more in detail and with reference to Figs. 2 to 9 in which the parts are shown as they may be constructed and arranged in practice. As mentioned the differential gear is of the bevel wheel type comprising the two wheels E3, E4 and the pinions E2 which are carried in a suitably arranged cage E5 rotatable about the axis of the gear. The shafts J2 and N on which are mounted the two main wheels E3 and E4 are coaxial and extend in opposite directions as may be seen in Fig. 3. The cage E5 has on its exterior teeth E1 which conveniently extend only over a portion of the periphery of the cage owing to the limited rotational movement which it is necessary to give to the cage. Meshing with the toothed sector E1 on the cage is a pinion D1 on the shaft D which is rotated by the action of the servomotor C.

This motor has a radial blade C1 projecting from the shaft D and movable in its casing when pressure liquid is admitted to one side or the other of the blade as will occur when the pilot's operating lever A is moved in one direction or the other. The actuation of the valve B controlling the admission of this pressure liquid is effected through mechanism as otherwise known. With this mechanism, when the operating lever A is turned through a determined angle, a cylindrical valve B1 is rapidly moved thereby so as to open a port B2 leading to one side of the blade C1 of the servomotor and to admit pressure fluid thereto through passages B3. At the same time a port B4 (indicated in dotted lines) is opened on the other side of the servomotor blades C1 which communicates with a drain through passages B5. The blade C1 and the shaft D thus begin to move, but the ports B2 and B4 are formed in the shaft D to which the blade C1 is attached, and therefore move with it. This following-up arrangement ensures that the blade C1 and the shaft D move through the same angle as that through which the valve B1 has been turned. It will be seen that this rotation of the shaft D due to moving the operating lever A through a certain angle will cause a corresponding rotation of the cage E5 with the bevel pinions E2 about the axis of the differential gear and the cage and pinions will be retained in the angular position in which they are thus set until the operating lever is again moved.

The one bevel wheel E3 of the differential gear can be rotated in one direction or the other by the action of the primary servomotor J1 to which pressure is admitted according to the setting of the piston valve J. This servomotor J1 is preferably of the rotary type with radial blades J4 projecting from the shaft J2 the direction in which the shaft is turned being determined by the flow of pressure liquid to and from the servomotor through the piping J5 as permitted by the setting of the valve J, the shaft J2 being held in the angular position into which it is moved when the flow of pressure liquid is stopped. From the second bevel wheel E4 through the shaft N on which it is mounted and a lever N1 on this shaft there is a connection to the engine throttle. Thus if the bevel wheel E3 after it has been angularly set by the servomotor J1 is held against rotation and the operating lever A is then moved so as to cause rotation through a determined angle of the shaft D, the cage of the differential with the pinions E2 will be turned through a corresponding angle about the axis of the gear and will cause a rotation of the second bevel wheel E4 and shaft N and a movement will thereby be imparted to the throttle. On the other hand if the operating lever A is not moved and the cage of the differential with the pinions E2 is held stationary, and if pressure liquid is then admitted to the servomotor J1 so that it rotates the shaft J2 and the bevel wheel E3, this will also rotate the bevel wheel E4 and the shaft N and movement will be given to the throttle.

The piston valve J controlling the servomotor J1 can reciprocate in a ported sleeve J6 mounted in a casing O at each end of which is a diaphragm O1, O2 extending across the open end of the casing, the centre part of each diaphragm lying in contact with one end of the piston valve. Each diaphragm is held by a ring O3 and they prevent oil leakage, the valve itself between the diaphrams being in hydraulic balance. The piston valve J at each end is connected to one of these diaphragms the end of the valve having a threaded part which passes through a hole in the centre of the diaphragm to which it is secured by sealing washers and nuts O4, O5. The nut O4 at the upper end of the valve conveniently has a rounded or part-spherical face. At the opposite end of the valve the nut O5 has around it, and bearing on a cupped or other suitable washer, the one end of a coiled spring J3 the other end of which bears against a fixed abutment O6 carried by or forming part of the casing which encloses the whole apparatus.

A capsule H which is totally evacuated is suspended at its upper end from a casing P by a threaded member H4 which permits adjustment of the position of this end of the capsule. Extending from the lower end of the capsule is a rod H1 whose end bears on the rounded face of the nut O4 on the upper end of the piston valve J. Fixed on this rod H1 at or near its end is a disc H3 whose upper side serves as an abutment for one end of a coiled spring H2 on the upper end of which rests a disc H5 which is pressed onto the spring by the end of the arm G1 of the lever which through its other arm G is acted on by the datum boost cam F2. The spring H2 thus acts in opposition to any collapsing tendency of the capsule H which the action of the capsule is somewhat assisted by the spring J3 which acts on the lower end of the valve J. The capsule and the spring H2 are enclosed in a casing P, P1 which is subjected internally to boost pressure. Apart from the connection of the valve J at its opposite ends to the diaphragms O1, O2 the valve floats between the spring J3 and the lower end of the rod H1 and this construction is very sensitive to boost pressure, while the force exerted by the spring H2 in opposition to the capsule is variable in accordance with the setting of the datum boost cam F2.

Figure 2:
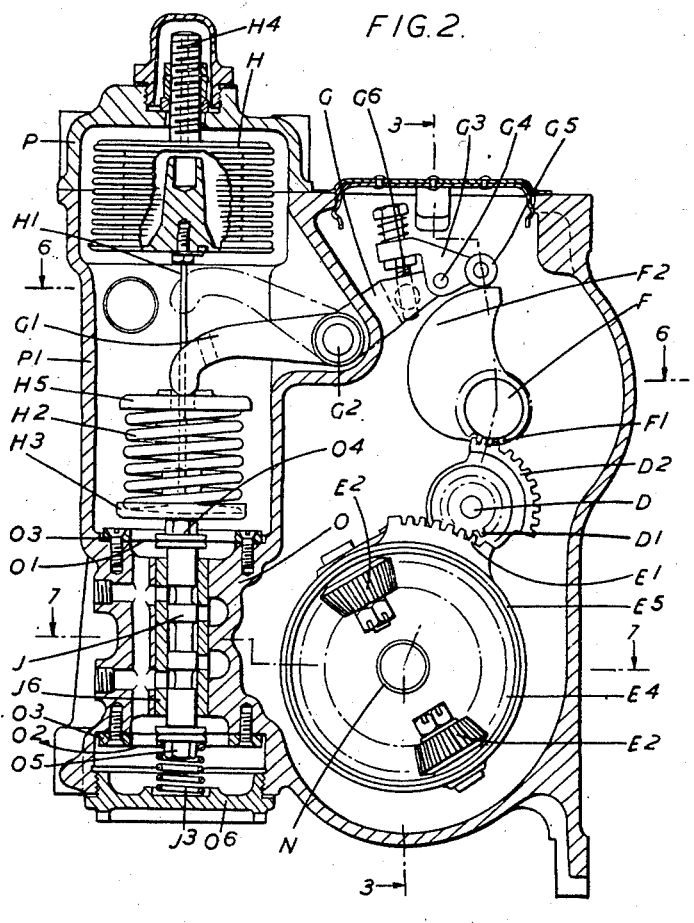
Figure 2 is a sectional elevation of the apparatus as it may be constructed, the section being in the plane of the line 2—2 in Figure 3 looking in the direction of the arrows.
Figure 3:
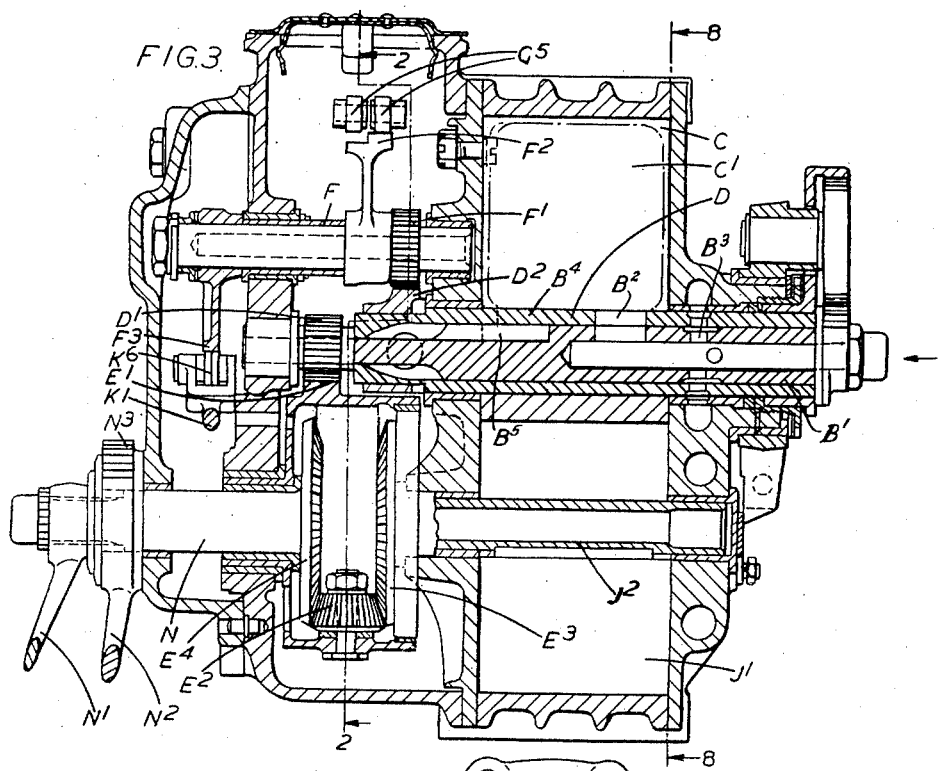
Figure 3 is a section on the line 3—3 in Figure 2 looking in the direction of the arrows.
Figure 8:
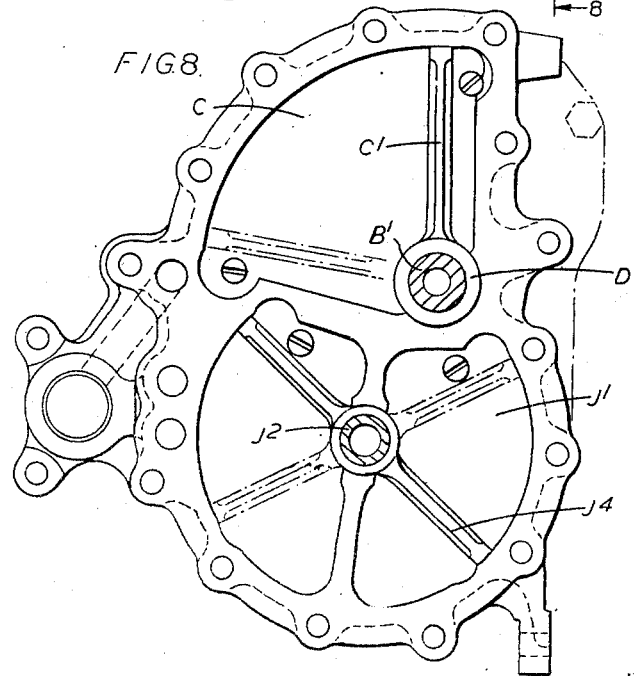
Figure 8 is a section on the line 8—8 in Figure 3.
Figure 4:
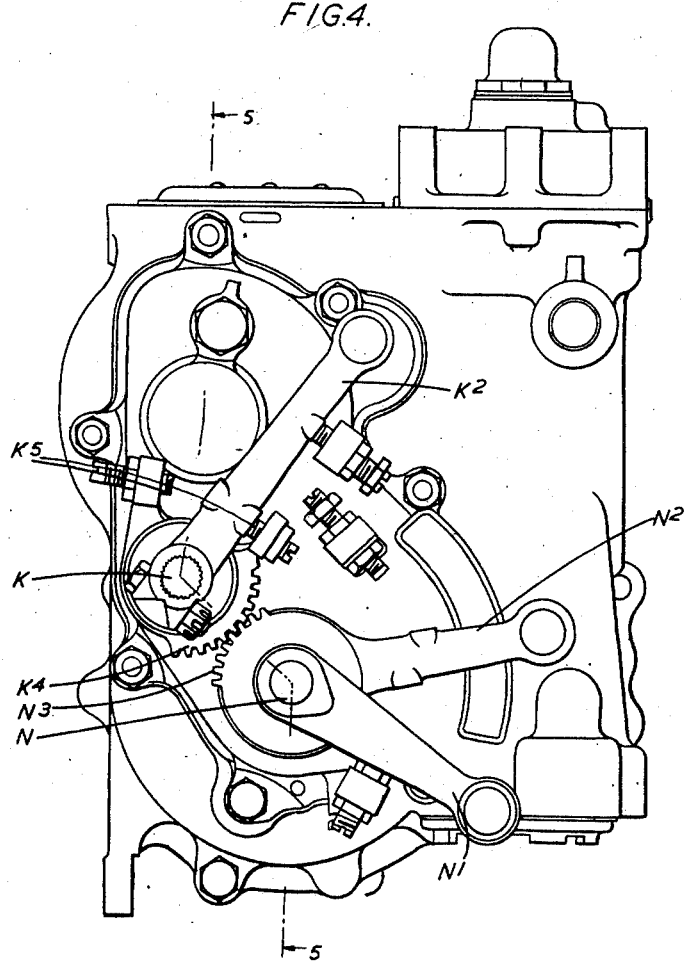
Figure 4 is an end view showing the apparatus as seen from the lefthand side as it appears in Figure 3.
Figure 5:
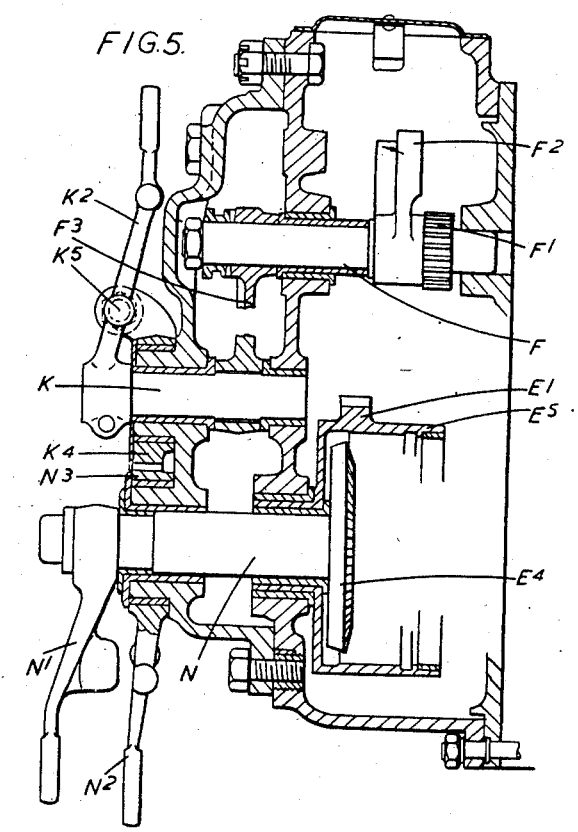
Figure 5 is a section on the line 5—5 in Figure 4 looking in the direction of the arrows.
Figure 6:
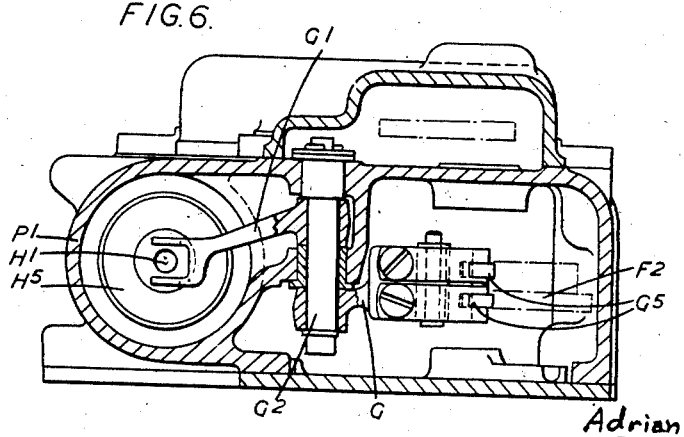
Figure 6 is a sectional plan on the line 6—6 in Figure 2.
Figure 7:
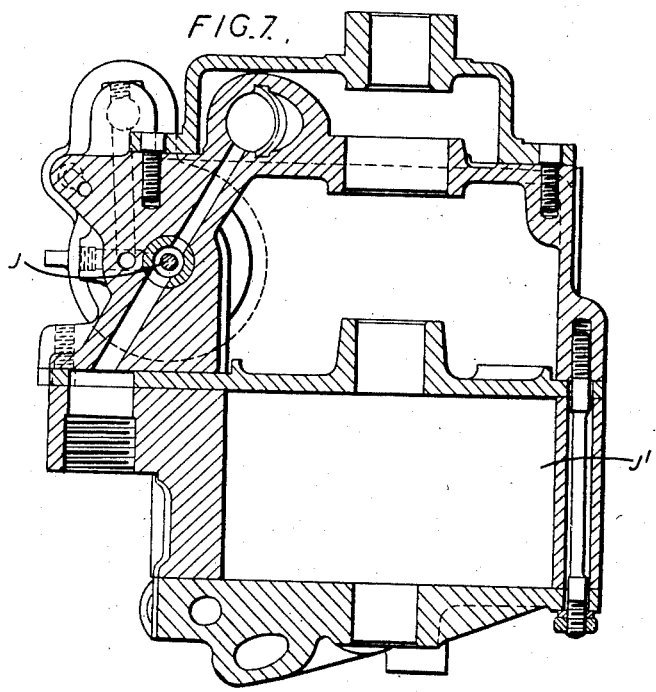
Figure 7 is a sectional plan on the line 7—7 in Figure 2 with certain rotatable parts omitted.
Figure 9:
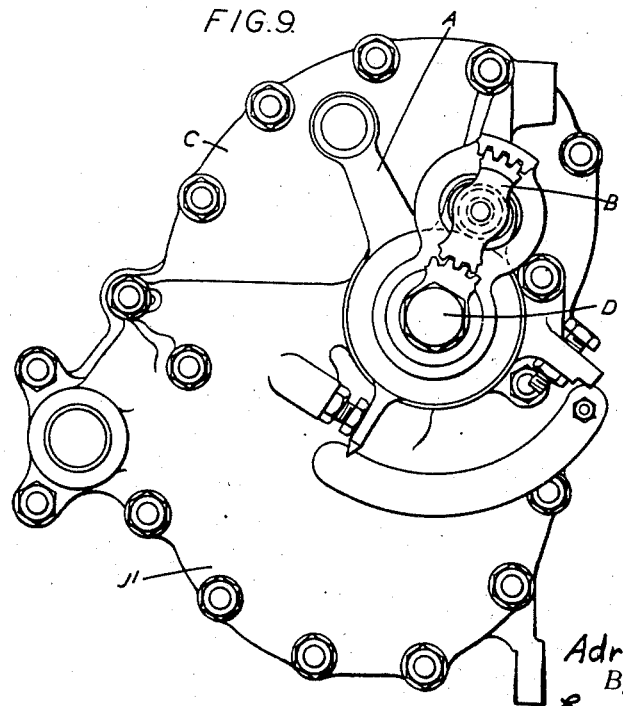
Figure 9 is a view showing the end of the apparatus as seen from the righthand side of Figure 3.

The datum boost cam F2 is mounted on a shaft F which carries a toothed wheel F1 meshing with the toothed sector D2 on the shaft D of te servomotor C, so that the cam will be set in accordance with the setting of the operating lever A. To admit of a nice adjustment in the action of the cam F2 on the spring H2, the arm G of the lever through which the cam acts on the spring is provided with an articulated end. This comprises, as seen in Fig. 2, a short lever member G3 pivoted at G4 on the end of the lever arm G and carrying at one end a roller G5 which rests on the cam F2 and at the other end an adjustable stud G6 which bears on a part of the lever arm G. By adjusting this stud it is possible to alter the angular position of the member G3 in relation to the main part of the lever arm G and this has the effect of varying the angular position of the lever G, G1 with respect to the cam F2 on the one hand and the spring H2 on the other whereby the datum boost spring H2 can be correctly set.

On the shaft F which carries the datum boost cam F2 is a second cam F3 which may be referred to as the speed cam in that it acts on the airscrew governor and on the ignition control. See Figs. 3 and 5. This action takes place through a shaft K which carries a lever K1 with a roller K6 bearing on the cam F3 and a second lever K2 operatively connected in some convenient known manner, such as indicated in Figure 1, to the airscrew governor M and ignition control mechanism M2. While the roller K6 on the lever K1 may be kept in contact with the cam F3 by means of a spring, it is convenient to employ fluid pressure in a cylinder L acting on a piston L1 with a rod which is connected to the lever K1, as indicated diagrammatically in Figure 1. The fluid pressure in the cylinder L then tends to turn the shaft K and the control lever K2 in one direction while leaving the shaft free to be moved independently as by means of an override lever. This override lever N2 is mounted on the shaft N, or concentrically therewith, see Figure 5, but is not fixed to the shaft and can thus be moved separately. The lever N2 carries a toothed quadrant N3 which meshes with a toothed sector on a member K4 carried by but freely rotatable on or concentric with the shaft K, see Figure 4. On the member K4 are two adjustable stops K5 spaced apart circumferentially and positioned so that they lie on each side of the control lever K2. By this means if the override lever N2 is turned it is possible to move the speed control lever K2 into its limit position and thereby cause the air screw blades to be set to fully fine pitch. When the operating lever A is in the closed position, that is to say when the throttle valve actuated by this lever is shut, a depression in the profile of the speed cam F3 allows the speed control lever K2 to be moved in the opposite direction to the limit of its travel which will result in setting the air screw blades in the "positive coarse" or in the "feathered" position. This position can only be reached when the override lever N2 has been set to the position for "positive coarse" setting of the air screw. If the override lever N2 is left in its normal position the speed control lever K2 will move automatically from the position to produce coarse pitch or minimum revolutions to the position to produce fine pitch or maximum revolutions when the speed cam F3 is turned by the pilot's operating lever.

Referring again to the valve J controlling the primary servomotor J1, when this valve is in its central or sensitive position pressure liquid is cut off from the servomotor, but if the valve is caused to move towards the capsule H, oil is admitted to the servomotor in a manner which will cause it to close the throttle by acting through the differential gear. Conversely when the valve J moves away from the capsule the flow of oil to the servomotor J1 will cause it similarly to open the throttle. Any movement of the lever G, G1 actuated by the datum boost cam F2 by its action on the spring H2 will upset the balance of the system and cause a movement of the piston valve J thereby changing the opening of the throttle. On account of the wide range of boost pressures required it is advantageous, as in the present arrangement, to have outside the capsule H a spring H2 by which the capsule datum is varied. With an internal capsule spring load variations on the spring are only obtained by allowing the capsule as a whole to change in length, but with the present method the capsule movement can be limited to plus or minus three thirty-seconds of an inch. This permits the use of a much shorter capsule and also completely eliminates any fatigue stresses in the capsule. With regard to the subsidiary servomotor C the controller of this is conveniently constructed so that its angular movement relative to the movement of the operating lever is stepped up in a ratio of 4 to 1. This gives a quick valve opening for the operation of the servomotor. The gearing actuating the camshaft may be such that this shaft will turn for example at twice the speed at which the servomotor shaft is turned and this enables reasonable cam profiles to be employed.

The boost control embodied in the present invention may be referred to as being of the reverse action type in that the butterfly or throttle valves are opened a small amount mechanically and the necessary extra movement to obtain any required selected boost is supplied by the automatic action of the servomotor J1 in rotating one of the wheels E3 of the differential. This system of operation allows the pilot to climb at any selected boost to the maximum altitude possible corresponding to that boost without resetting the operating lever, because with the lowest boost setting likely to be used for climbing there is sufficient automatic movement available in the primary servomotor to fully open the throttle valve.

The automatic part of the present control apparatus is rendered inoperative at low engine speeds. It has been found desirable to do this on account of the unstable behaviour of the boost pressures obtaining when the supercharger is running at low speeds. By so shaping the datum boost cam F2 that the boost called for is less than the actual boost obtained from the engine, the point at which the servomotor J1 begins to operate can be controlled. In such a single lever control system as the present this should be coincident with the point at which the air screw governor begins to operate.

What I claim as my invention and desire to secure by Letters Patent is:

1. Apparatus for the control of an internal combustion engine for driving an air screw and comprising a super-charger, a pitch changing device provided with a governor, an ignition system and a control therefor, and a throttle valve, in combination with a differential gear, a connection between the first main wheel of this gear and the engine throttle through which the throttle can be adjusted, a primary servomotor operative to rotate the second and opposite main wheel in the said differential gear, a secondary servomotor with means for controlling it by an operating lever, means by which the cage with the pinions of the said differential gear can be rotated about the axis of the gear by the said secondary servomotor, a valve controlling the flow of pressure liquid to the said primary servomotor, a capsule subject on the one hand to the engine boost pressure and on the other hand to the action of a spring, a connection between the capsule and the said control valve of the said primary servomotor, a cam shaft with means for rotating it by the said secondary servomotor when this motor is operative to move the pinion cage of the said differential gear, a datum boost cam on the said cam shaft operative to vary the force exerted by the said spring on the said capsule and thus effect the setting by the capsule of the said valve of the said primary servomotor, a second cam on the said cam shaft, transmission means from said second cam operative on said airscrew governor and on the engine ignition control, an override lever operative on the airscrew governor and the engine ignition, a rotatable member included in said transmission means from said second cam on the cam shaft, stops spaced circumferentially apart on this member, a lever movable between these stops with a connection from this lever to means for setting the airscrew governor and the engine ignition, and a connection between said override lever and said stop-carrying member.

2. Apparatus for the control of an internal combustion engine comprising the parts as set out in claim 1 and in which the control valve of the said primary servomotor is a piston valve mounted so that it floats between two diaphragms serving as oil seals at the opposite end of the valve, the valve being balanced on the one hand by its connection to the said capsule and the consequent tendency for the valve to be moved in one direction by the action of the boost pressure on the capsule together with the action of a spring operative on the end of the valve, and on the other hand by the said spring which acts on the capsule.

ADRIAN LESLIE CATFORD.

REFERENCES CITED

The following references are of record in the file of this patent:

UNITED STATES PATENTS

| Number | Name | Date |
| --- | --- | --- |
| 2,115,485 | Dodson | Apr. 26, 1938 |
| 2,217,364 | Halford | Oct. 8, 1940 |
| 2,383,719 | Halford et al. | Aug. 28, 1945 |
| 2,453,651 | Mock | Nov. 9, 1948 |
| 2,457,595 | Orr | Dec. 28, 1948 |